United States Patent [19]

Tanaka et al.

[11] Patent Number: 5,628,820

[45] Date of Patent: May 13, 1997

[54] INK COMPOSITION FOR FORMING THIN FILM

[75] Inventors: Katsuto Tanaka; Kensuke Makita, both of Matsusaka, Japan

[73] Assignee: Central Glass Company, Ltd., Ube, Japan

[21] Appl. No.: 492,920

[22] Filed: Jun. 20, 1995

[51] Int. Cl.$^6$ .......................... C09D 11/02; C09D 11/14
[52] U.S. Cl. ........................ 106/31.39; 106/31.86
[58] Field of Search .................. 106/19 D, 19 C, 106/26 A, 287.19; 501/12

[56] References Cited

U.S. PATENT DOCUMENTS

| | | | |
|---|---|---|---|
| 4,361,598 | 11/1982 | Yoldas | 106/287.19 |
| 4,411,703 | 10/1983 | Whitehouse | 106/289.19 |
| 4,579,594 | 4/1986 | Nanao et al. | 106/287.19 |
| 4,908,065 | 3/1990 | Tanitsu et al. | 106/287.19 |
| 5,108,479 | 4/1992 | Hirano | 65/60.52 |
| 5,250,322 | 10/1993 | Takahashi et al. | 501/12 |
| 5,262,362 | 11/1993 | Covino-Hrbacek | 106/287.19 |
| 5,338,350 | 8/1994 | Tanaka et al. | 106/19 D |

FOREIGN PATENT DOCUMENTS

| | | |
|---|---|---|
| 63-48372 | 3/1983 | Japan . |
| 64-56776 | 3/1989 | Japan . |
| 2-60974 | 3/1990 | Japan . |

*Primary Examiner*—Helene Klemanski
*Attorney, Agent, or Firm*—Keck, Mahin & Cate

[57] ABSTRACT

An ink composition for forming a thin metal oxide film contains a glass-forming component, a solvent and 10–25 wt % of a viscosity-increasing agent. The glass-forming component is one of a halogen-containing metal alkoxide, a mixture of the halogen-containing metal alkoxide and another metal alkoxide, and a mixture of the halogen-containing metal alkoxide and a metal oxide sol. The viscosity-increasing agent is at least one selected from the group consisting of nitrocellulose H7, nitrocellulose H20, nitrocellulose H60. nitrocellulose H80 and nitrocellulose H120, each of which is according to Japanese Industrial Standard K 6703. The solvent is at least one selected from the group consisting of ethylcarbitol and butylcarbitol. The ink composition has a viscosity within a range from 200 to 300 poises. The thus prepared ink composition is prolonged in pot life. The thin metal oxide film prepared from the ink composition has a refractive index substantially the same as the theoretical value and is colorless, uniform in thickness, and excellent in optical characteristics, abrasion resistance, scratch resistance and durability.

7 Claims, No Drawings

INK COMPOSITION FOR FORMING THIN FILM

BACKGROUND OF THE INVENTION

This invention relates to an ink composition for forming a thin metal oxide film on a substrate made of glass, ceramic or the like.

It is known to form a thin metal oxide film on a substrate with an ink containing a base metal compound such as metal oxide hydrate or metal alkoxide, a binder such as resin, a solvent and other additives such as pigment and the like.

For example, JP-A-63-48372 discloses an ink composition containing an organic coloring material, a binder such as silicon alkoxide, and a solvent such as alkyl alcohol.

JP-A-64-56776 discloses a heat-resistant ink for an ink jet printer. This ink contains a hydrolyzed metal alkoxide in the form of solid, a solvent, a binder and an electric conductivity imparting agent.

JP-A-2-60974 discloses an ink composition containing a compound containing a base metal such as metal alkoxide, abletic acid as a viscosity-increasing agent, and a solvent such as butylcarbitol.

It is known to form a thin film on a substrate by screen printing, gravure, intaglio printing, stamping or spraying. For example, U.S. Pat. No. 5,108,479 discloses a method for forming a functional film on a glass plate by screen printing with an ink composition containing a metal alkoxide and a viscosity-increasing agent such as ethyl cellulose or nitrocellulose.

However, as is mentioned hereinabove, when a simple metal alkoxide is contained in an ink composition, it is necessary to hydrolyze the metal alkoxide to form a sol through polycondensation. With this, viscosity of the ink tends to change and its pot life tends to be shortened. When a conventional cellulose type viscosity-increasing agent is contained in an ink, a large amount of carbon tends to remain in a thin film even after the drying and baking of the thin film. Therefore, the thin film tends to have a yellowish brown color damaging its external appearance. Furthermore, its strength such as scratch resistance tends to be substantially lowered.

In general, an ink is applied by printing to a substrate to form a thin film thereon, and then the printed film is baked at a certain high temperature to transform the printed film to a metal oxide film. However, in some cases, the printed film is provisionally dried at a certain temperature which is lower than the baking temperature to obtain a semifinished product, and then this semifinished product is stored until its baking. In this case, the thus dried film made from a conventional ink containing a film-forming component such as simple metal alkoxide and a conventional cellulose type viscosity-increasing agent may have a decomposition of the film-forming component due to moisture in the atmosphere or the like, and thus the baked film may have a refractive index which is substantially lower than the theoretical value expected from the ink composition or may become inferior in durability.

U.S. Pat. No. 5,338,350 discloses an ink composition comprising: one selected from the group consisting of a halogen-containing metal alkoxide, a mixture of the halogen-containing metal alkoxide and another metal alkoxide, and a mixture of the halogen-containing metal alkoxide and a metal oxide sol; nitrocellulose H60 according to Japanese Industrial Standard K 6703; and at least one selected from the group consisting of ethylcarbitol and butylcarbitol. The ink composition disclosed in this patent has a viscosity of about 23.2 poises (see column 3, lines 55–56).

SUMMARY OF THE INVENTION

It is therefore an object of the present invention to provide an ink composition which is free of the above-mentioned drawbacks.

It is a more specific object of the present invention to provide an ink composition, which is prolonged in pot life, and allows of forming a thin metal film which has a refractive index substantially the same as the theoretical value and is colorless, uniform in thickness, and excellent in optical characteristics, abrasion resistance, scratch resistance and durability.

The present invention provides an ink composition for forming a thin metal oxide film, comprising:

a glass-forming component which is one selected from the group consisting of a halogen-containing metal alkoxide, a mixture of said halogen-containing metal alkoxide and another metal alkoxide, and a mixture of said halogen-containing metal alkoxide and a metal oxide sol;

10–25 wt % of a viscosity-increasing agent which is at least one selected from the group consisting of nitrocellulose H7, vitrocellulose H20, vitrocellulose H60, vitrocellulose H80 and vitrocellulose H120, each of which is according to Japanese Industrial Standard K 6703; and a solvent which is at least one selected from the group consisting of ethylcarbitol and butylcarbitol, wherein the ink composition has a viscosity within a range from 200 to 300 poises.

According to the present invention, the ink composition contains the above special glass-forming component and 10–25 wt % (preferably 10–20 wt %) of the above special viscosity-increasing agent (i.e. a resin binder) and has the above specific viscosity range. With this, it is possible to substantially suppress the decrease of the refractive index of the baked thin film (metal oxide film) from the theoretical value and the deterioration of the metal oxide film in durability. Furthermore, it is possible to increase the ink composition viscosity to a viscosity which is suitable for screen printing, gravure, intaglio printing, stamping and spraying.

According to the present invention, the ink composition is substantially prolonged in pot life, allows the printed film to be provisionally dried at a relatively low temperature, and allows the thin metal oxide film to have the following advantages. That is the thin metal oxide film has a refractive index which is not substantially lower than but substantially the same as the theoretical value, irrespective of the storage period of the above-mentioned semifinished product under the dried condition; the thin metal oxide film has a substantially uniform thickness even if it has a relatively large surface area; the thin metal oxide film has superior optical characteristics such as nonselective high reflectance; and the thin metal oxide film is superior in transparency, abrasion resistance, scratch resistance and durability. Thus, the ink composition is very suitable for forming such thin metal oxide film on various glass products such as automobile window glasses and architectural window glasses.

DESCRIPTION OF THE PREFERRED EMBODIMENTS

An ink composition according to the present invention will be described in the following. The ink composition comprises, as a glass-forming component, a halogen-containing metal alkoxide, a first mixture of the halogen-containing metal alkoxide and another metal alkoxide, or a second mixture of the halogen-containing metal alkoxide and a metal oxide sol.

The halogen-containing metal alkoxide is used as an example of the glass-forming component, because the halogen-containing metal alkoxide solution is not hydrolyzed even if a small amount of water is added thereto. This occurs due to peptization. Thus, pot life of the ink composition is prolonged. However, when the ink is applied to a substrate so as to form thereon a thin film having a large surface area, contact area between the ink and the atmosphere is greatly increased. Due to this, the halogen-containing metal alkoxide is hydrolyzed by moisture in the atmosphere. With this, a thin gel film is formed.

The first mixture of the halogen-containing metal alkoxide and the another metal alkoxide or the second mixture of the halogen-containing metal alkoxide and the metal oxide sol are used as further examples of the glass-forming component. Due to the use of the metal alkoxide containing a halogen such as chlorine in the first or second mixture, it is not necessary to add water and a catalyst to the first or second mixture to form a sol. Therefore, pot life of the ink composition is substantially prolonged.

Examples of the another metal alkoxide are silicon tetraethoxide, titanium tetraisopropoxide and zirconium isobutoxide. Examples of the metal oxide sols are silica sol and titanium oxide sol.

An ink composition according to the present invention further comprises 10–25 wt % (preferably 10–20 wt %) of a viscosity-increasing agent which is at least one selected from the group consisting of nitrocellulose H7, nitrocellulose H20, nitrocellulose H60, nitrocellulose H80 and nitrocellulose H120. Each of these nitrocelluloses is according to Japanese Industrial Standard (JIS) K 6703. Regarding these nitrocelluloses, a capital letter "H" represents one type of nitrocellulose according to JIS K 6703, and the number following this capital letter "H" represents a relative viscosity thereof. In fact, the higher the number, the higher the viscosity. Therefore, of these nitrocelluloses, nitrocellulose H7 and nitrocellulose H120 have the lowest and highest viscosities, respectively.

When the above special viscosity-increasing agent is used, the viscosity of the ink is lowered during the printing process, in response to shear stress caused by a squeegee and the like. That is, the ink (its viscosity is within a range from 200 to 300 poises) will have a so-called apparent viscosity within a range from about 1 poise to about 20 poises, during the printing process. Therefore, the printing process efficiency is not impaired. When a nitrocellulose having a viscosity lower than that of nitrocellulose H7, such as nitrocellulose 2, 1, ½, ⅛, 1/16 or the like is contained in an ink, the viscosity of such ink not according to the present invention is not so lowered during the printing process as that of the ink according to the present invention is. Therefore, when such ink not according to the present invention has a viscosity within a range from 200 to 300 poises, the printing process may be damaged.

As is mentioned hereinabove, the ink composition contains 10–25 wt % (preferably 10–20 wt %) of the viscosity-increasing agent. Within this range, a thin film of the ink composition will have a surface film on the surface thereof when the thin film is dried. It is considered that this surface film serves to suppress an undesirable effect caused by moisture of the atmosphere, on the thin film.

As is mentioned hereinabove, the ink composition has a viscosity within a range from 200 to 300 poises. If it is less than 200 poises, the viscosity during the printing may become too low. With this, the ink tends to spread over a screen and thus the ink on the screen tends to be dried. Thus, a loss of the ink composition tends to increase. In case that the viscosity is greater than 300 poises, the efficiency of the screen printing process may become substantially worse. Furthermore, in this case, carbon may still remain in the baked thin film as a result of that nitrocellulose has not been completely decomposed during the baking. With this, the baked thin film may have a yellowish brown color and may be uneven in thickness and inferior in mechanical and chemical durabilities.

In the invention, by virtue of using the viscosity-increasing agent which is the above special type and has the above special amount and the above special viscosity, it becomes possible to form a thin metal oxide film which is superior in durability and has a refractive index substantially the same as the theoretical value.

An ink composition according to the present invention still further comprises, as a solvent, ethylcarbitol, butylcarbitol or a mixture of these compounds. Due to the use of ethylcarbitol, butylcarbitol or a mixture of these compounds, drastic drying of the ink composition before printing can be prevented and the printed film can be dried at a relatively low temperature such as about 200° C. Therefore, pot life of the ink composition is prolonged.

The above-mentioned halogen-containing metal alkoxide comprises at least one selected from the group consisting of Ti, Zr, Sn, In and Ta. Therefore, a non-selective reflection-increasing metal oxide film which is superior in strength and optical characteristics such as transparency can be obtained.

The most preferable example of the halogen of the halogen-containing metal alkoxide is chlorine. Chlorides are cheap in price and very common as a raw material to synthesize an alkoxide. In the case of salts other than chlorides, it is difficult to separate an lo alkoxide from a solvent, using solubility difference. For example, many of fluorides or bromides exist in the form of salt hydrate. Therefore, water tends to remain in the alkoxide. On the other hand, chlorides have anhydrous salts.

An ink composition according to the present invention contains 1.0–2.0 wt %, on a metal oxide basis, of a first mixture of the halogen-containing alkoxide and the another metal alkoxide or of a second mixture of the halogen-containing alkoxide and the metal oxide sol. If the content is less than 1.0 wt %, the film thickness may become too thin and uneven. With this, the external appearance of the film may be damaged, and the desired refractive index, the reflection characteristics and the transmission characteristics may not be obtained. If the content is higher than 2.0 wt %, the film thickness may become too thick. In particular, if the film thickness is 150 nm or more, cracks tend to occur in the film. Therefore, the film strength may become lowered. When the content is adjusted to 1.0–2.0 wt %, the film thickness becomes uniform and cracks do not occur in the film even if screen-printing, gravure or intaglio printing which makes the film thickness relatively thick is taken.

The present invention will be illustrated with reference to the following nonlimitative examples.

EXAMPLE 1

An ink composition containing nitrocellulose H7 according to the present invention was prepared as follows.

Chlorine-containing metal alkoxide, $Ti(OC_3H_7)_xCl_y$ (x+y=4), which has a solute concentration of about 1.5 mol/l was prepared by reacting titanium tetrachloride with isopropyl alcohol. About 6.1 g of the acid chlorine-containing metal alkoxide was mixed with about 13.9 g of acid silica sol having a solute concentration of about 0.3 mol/l so as to form a mixed alkoxide solution. The molar ratio of $TiO_2$ to $SiO_2$ in the mixed alkoxide solution was 65 to 35. The total amount (20 g) of the mixed alkoxide solution was mixed with about 18 g (about 18 wt % based on the total weight of the ink composition) of nitrocellulose H7 made by DAICEL CHEMICAL INDUSTRIES CO. and about 62 g of ethylcarbitol, and the mixture was sufficiently stirred so as to obtain an ink composition according to the present invention. The ink composition had a solute concentration of about 1.2 wt % on a metal oxide basis and a viscosity of about 200 poises.

The ink composition was continuously applied to glass substrates by screen printing with a TETORON (trademark) screen having a mesh size of 350 and a squeegee having a Shore hardness of HS61, so as to form thin films having a certain shape thereon. The thus printed glass substrates were successively carried on a mesh belt and then passed through a continuous drier at a temperature of about 100° C. for about 2 rain so as to dry the thin films. Immediately after drying the thin films, a first half of the total number of the printed glass substrates was baked by passing it through a gas heater at an atmospheric temperature of about 610° C. for about 12 min. After drying the thin films, a second half of the total number of the printed glass substrates was allowed to stand still at a temperature of about 25° C. for about 6 hrs. Then, the second half was baked under the same condition as above.

All of the thus baked thin films were transparent and uniform, and had a thickness of about 60 nm and a refractive index of about 1.95 by the measurement with an ellipsometer. This refractive index was the same as the theoretical value expected from the ink composition and the baking condition. The thin films were half-mirrorlike in external appearance and made of a mixture of $TiO_2$ and $SiO_2$ and had a visible light reflectance of about 19%. The thin films were subjected to durability tests such as acid resistance test, alkali resistance test and abrasion resistance test (Taber abrasion test). Each thin film was satisfactory in these tests and met the standards for the automobile window glass and the interior glass,

EXAMPLE 2

An ink composition containing nitrocellulose H60 according to the present invention was prepared as follows.

The ink composition was prepared by mixing together 23.5 g of the same mixed alkoxide solution as that of Example 1, about 13 g (about 13 wt % based on the total weight of the ink composition) of nitrocellulose H60 and about 63.5 g of butylcarbitol, and then by sufficiently stirring the mixture. The ink composition had a solute concentration of about 1.4 wt % on a metal oxide basis and a viscosity of about 255 poises.

The thus prepared ink composition was continuously applied to glass substrates in the same manner as in Example 1. Then, the thus printed glass substrates were successively dried in the same manner as in Example 1. Immediately after drying the thin films, a first half of the total number of the printed glass substrates were baked in the same manner as in Example 1. After drying the thin films, a second half of the total number of the printed glass substrates were allowed to stand still at a temperature of about 28° C. for about 24 hrs. Then, the second half was baked under the same condition as in Example 1.

All of the thus baked thin films were transparent and uniform, and had a thickness of about 75 nm and a refractive index of about 1.95 by the measurement with an ellipsometer. This refractive index was the same as the theoretical value expected from the ink composition and the baking condition. The thin films were half-mirrorlike in external appearance and made of a mixture of $TiO_2$ and $SiO_2$ and had a visible light reflectance of about 19%. The thin films were subjected to durability tests such as acid resistance test, alkali resistance test and abrasion resistance test (Taber abrasion test), Each thin film was satisfactory in these tests and met the standards for the automobile window glass and the interior glass.

EXAMPLE 3

An ink composition containing nitrocellulose H60 according to the present invention was prepared as follows.

A mixed alkoxide solution having a molar ratio of $TiO_2$ to $SiO_2$ of 80:20 on a metal oxide basis was prepared by mixing together the same chlorine-containing metal alkoxide and the same acid silica sol as those of Example 1. The ink composition was prepared by mixing together about 23.5 g of the mixed alkoxide solution, about 13 g (about 13 wt % based on the total weight of the ink composition) of nitrocellulose H60 and about 63.5 g of ethylcarbitol, and then by sufficiently stirring the mixture. The thus prepared ink composition had a solute concentration of about 1.4 wt % on a metal oxide basis and a viscosity of about 260 poises.

The thus prepared ink composition was continuously 20. applied to glass substrates in the same manner as in Example 1. Then, the thus printed glass substrates were successively dried in the same manner as in Example 1. Immediately after drying the thin films, a first half of the total number of the printed glass substrates was baked by passing it through a gas heater at an atmospheric temperature of about 500° C. for about 15 min. After drying the thin films, a second half of the total number of the printed glass substrates was allowed to stand still under the same condition as that of Example 2. Then, the second half was baked under the same condition as above.

All of the thus baked thin films were transparent and uniform, and had a thickness of about 80 nm and a refractive index of about 2.00 by the measurement with an ellipsometer. This refractive index was the same as the theoretical value expected from the ink composition and the baking condition. The thin films were half-mirrorlike in external appearance and made of a mixture of $TiO_2$ and $SiO_2$ and had a visible light reflectance of about 20%. The thin films were subjected to durability tests such as acid resistance test, alkali resistance test and abrasion resistance test (Tuber abrasion test). Each thin film was satisfactory in these tests and met the standards for the automobile window glass and the interior glass.

EXAMPLE 4

An ink composition containing nitrocellulose H80 according to the present invention was prepared as follows.

Similar to Example 1, a chlorine-containing zirconium alkoxide having a solute concentration of about 0.4 mol/l was prepared by reacting zirconium tetrachloride with butyl alcohol. The ink composition was prepared by mixing together about 25 g of the chlorine-containing zirconium alkoxide, about 11 g (about 11 wt % based on the total weight of the ink composition) of nitrocellulose H80 and about 64 g of butylcarbitol, and then by sufficiently stirring the mixture. The thus prepared ink composition had a solute concentration of about 1.3 wt % on a metal oxide basis and a viscosity of about 270 poises.

The thus prepared ink composition was continuously applied to glass substrates in the same manner as in Example 1. Then, the thus printed glass substrates were successively dried in the same manner as in Example 1. Immediately after drying the thin films, a first half of the total number of the printed glass substrates was baked in the same manner as in Example 3. After drying the thin films, a second half of the total number of the printed glass substrates was allowed to stand still at a temperature of about 25° C. for about 24 hrs. Then, the second half was baked under the same condition as above.

All of the thus baked thin films were transparent and uniform, and had a thickness of about 80 nm and a refractive index of about 1.91 by the measurement with an ellipsometer. This refractive index was the same as the theoretical value expected from the ink composition ant the baking condition. The thin films were half-mirrorlike in external appearance and made of $ZrO_2$ and had a visible light reflectance of about 17%. The thin films were, subjected to durability tests such as acid resistance test, alkali resistance test and abrasion resistance test (Tuber abrasion test). Each thin film was satisfactory in these tests and met the standards for the automobile window glass and the interior glass. In particular, each thin film was superior to that of Examples 1 and 2 with respect to alkali resistance test.

EXAMPLE 5

An ink composition containing nitrocelluloses H60 and H120 according to the present invention was prepared as follows.

The ink composition was prepared by mixing together about 26 g of the same mixed alkoxide solution as that of Example 1, about 12 g (about 12 wt % based on the total weight of the ink composition) of a mixture of nitrocellulose H60 and nitrocellulose H120 having a weight ratio of the former and the latter of 1:1 and about 68 g of ethylcarbitol, and then by sufficiently stirring the mixture. The thus prepared ink composition had a solute concentration of about 1.6 wt % on a metal oxide basis and a viscosity of about 240 poises.

In the same manners as in Example 1, the thus prepared ink composition was continuously applied to glass substrates, then the thus printed glass substrates were successively dried, and then the dried glass substrates were baked.

All of the thus baked thin films were transparent and uniform, and had a thickness of about 130 nm and a refractive index of about 1.95 by the measurement with an ellipsometer. This refractive index was the same as the theoretical value expected from the ink composition and the baking condition. The thin films were half-mirrorlike in external appearance and made of a mixture of $TiO_2$ and $SiO_2$ and had a visible light reflectance of about 18%. The thin films were subjected to durability tests such as acid resistance test, alkali resistance test and abrasion resistance test (Tuber abrasion test). Each thin film was satisfactory in these tests and met the standards for the automobile window glass and the interior glass.

In the present invention, various printing processes and various film-forming methods other than those of Examples 1–5 may be taken.

COMPARATIVE EXAMPLE 1

In this comparative example, the content of the viscosity-increasing agent in the ink composition and the ink composition viscosity were not in accordance with the present invention.

In this comparative example, Example 1 was repeated except in that about 8 g (about 8 wt % based on the total weight of 1.0 the ink composition) of nitrocellulose H60 and about 67 g of ethylcarbitol were used so as to prepare an ink composition and that the second half of the total number of the printed glass substrates was allowed to stand still at a temperature of about 28° C. for about 24 hrs. The thus prepared ink composition had a viscosity of about 21 poises.

It was possible to smoothly conduct the screen printing process. However, the ink composition had a tendency to gradually spread over the screen as the printing proceeded.

All of the baked thin films were transparent and uniform. The thickness and the refractive index of each thin film were measured with an ellipsometer. The baked thin films had thicknesses within a range from about 70 to about 75 nm. Each thin film was half-mirrorlike in external appearance and made of a mixture of $TiO_2$ and $SiO_2$. The first half (the samples baked immediately after the drying) had a refractive index of about 1.95 which is the same as the theoretical value expected from the ink composition and the baking condition, and a visible light reflectance of about 19%. In contrast, the second half had a refractive index of about 1.82 which is lower than the theoretical value and a visible light reflectance of about 17%.

The thin films were subjected to durability tests such as acid resistance test, alkali resistance test and abrasion resistance test (Taber abrasion test). In these tests, each thin film of the first half was satisfactory and met the standards for the automobile window glass and the interior glass. However, each thin film of the second half was not satisfactory in the acid resistance test, the alkali resistance test and the Taber abrasion test, and thus did not meet the standards for the automobile window glass and the interior glass.

What is claimed is:

1. An ink composition for forming a thin film metal oxide film, comprising:

a glass-forming component which comprises a member selected from the group consisting of a halogen-containing metal alkoxide, a mixture of said halogen-containing metal alkoxide and another metal alkoxide, and a mixture of said halogen-containing metal alkoxide and a metal oxide sol;

10–25 wt % of nitrocellulose viscosity-increasing agent which comprises at least one member selected from the group consisting of nitrocellulose H7, nitrocellulose H20, nitrocellulose H60, nitrocellulose H80 and nitrocellulose H120, each of which is numbered according to Japanese Industrial Standard K 6703; and a solvent which comprises at least one member selected from the group consisting of ethylcarbitol and butylcarbitol, wherein the ink composition has a viscosity within a range from 200 to 300 poises.

2. An ink composition according to claim 1, wherein metal of said halogen-containing metal alkoxide is at least one selected from the group consisting of Ti, Zr, Sn, In and Ta.

3. An ink composition according to claim 1, wherein halogen of said halogen-containing metal alkoxide is chlorine.

4. An ink composition according to claim 1, wherein the content of the mixture of said halogen-containing metal alkoxide and said another metal alkoxide or of the mixture of said halogen-containing metal alkoxide and said metal oxide sol in the ink composition is from 1.0 to 2.0 wt % on a metal oxide basis.

5. An ink composition according to claim 1, wherein the content of said viscosity-increasing agent in the ink composition is from 10 to 20 wt %.

6. An ink composition according to claim 1, wherein said another metal alkoxide is one selected from the group consisting of silicon tetraethoxide, titanium tetraisopropoxide and zirconium isobutoxide.

7. An ink composition according to claim 1, wherein said metal oxide sol is one selected from the group consisting of silica sol and titanium oxide sol.

* * * * *